US010541633B2

(12) United States Patent
Hudson

(10) Patent No.: US 10,541,633 B2
(45) Date of Patent: Jan. 21, 2020

(54) LOAD CONTROL SYSTEM AND METHOD FOR HYDROCARBON PUMP ENGINE

(71) Applicant: Husky Oil Operations Limited, Calgary (CA)

(72) Inventor: Skyler Jonathan Hudson, Lloydminster (CA)

(73) Assignee: Husky Oil Operations Limited, Calgary (CA)

( * ) Notice: Subject to any disclaimer, the term of this patent is extended or adjusted under 35 U.S.C. 154(b) by 246 days.

(21) Appl. No.: 15/468,197

(22) Filed: Mar. 24, 2017

(65) Prior Publication Data

US 2018/0274335 A1    Sep. 27, 2018

(51) Int. Cl.
| | | |
|---|---|---|
| H02P 9/04 | (2006.01) | |
| E21B 43/12 | (2006.01) | |
| H02K 7/18 | (2006.01) | |
| F02D 31/00 | (2006.01) | |
| F02D 19/02 | (2006.01) | |
| F02D 29/04 | (2006.01) | |
| F02D 41/00 | (2006.01) | |
| F02D 29/06 | (2006.01) | |

(52) U.S. Cl.
CPC .............. *H02P 9/04* (2013.01); *E21B 43/121* (2013.01); *F02D 19/027* (2013.01); *F02D 29/04* (2013.01); *F02D 29/06* (2013.01); *F02D 31/001* (2013.01); *F02D 41/0027* (2013.01); *H02K 7/1815* (2013.01); *F02D 2200/0406* (2013.01); *F02D 2200/0602* (2013.01); *F02D 2250/24* (2013.01)

(58) Field of Classification Search
CPC ........ H02P 9/04; F02D 31/001; F02D 19/027; F02D 41/0027; F02D 29/06; F02D 29/04; F02D 2250/24; F02D 2200/0406; F02D 2200/0602; H02K 7/1815; E21B 43/121
USPC ..... 60/39.25, 39.281, 793; 290/1 R, 7, 40 B, 290/40 R, 43, 52, 55
See application file for complete search history.

(56) References Cited

U.S. PATENT DOCUMENTS

| | | | |
|---|---|---|---|
| 4,634,887 A * | 1/1987 | Balch ..................... | B60L 15/20 290/3 |
| 4,730,118 A | 3/1988 | Quarles et al. | |
| 8,708,663 B1 | 4/2014 | Varani et al. | |
| 9,394,770 B2 | 7/2016 | Boot et al. | |
| 2005/0179263 A1* | 8/2005 | Johansen ............ | E21B 33/0355 290/1 R |
| 2007/0080537 A1* | 4/2007 | Albertson ............... | F02D 29/06 290/40 B |
| 2007/0233332 A1* | 10/2007 | Kawada ................ | B60K 6/365 701/13 |
| 2010/0038907 A1 | 2/2010 | Hunt et al. | |

(Continued)

FOREIGN PATENT DOCUMENTS

CA          2935772 A1       8/2015

*Primary Examiner* — Hoang M Nguyen
(74) *Attorney, Agent, or Firm* — Frost Brown Todd LLC; Nicole M. Tepe

(57) ABSTRACT

Systems and methods for reducing produced gas venting from a hydrocarbon well, in which the engine driving the pump burns produced gas from the well, the engine made to increase its throttle to burn more gas in response to an increased gas pressure indicator, and an external load such as a generator directed to increase the load on the engine and maintain the engine operating within a desired revolutions-per-minute range to avoid redline condition.

36 Claims, 6 Drawing Sheets

(56) References Cited

U.S. PATENT DOCUMENTS

2015/0078917 A1 3/2015 Torrey et al.
2016/0254768 A1* 9/2016 Falkowski ............ F01N 3/2066
290/40 C

* cited by examiner

LOAD CONTROL SYSTEM AND METHOD FOR HYDROCARBON PUMP ENGINE

FIELD OF THE INVENTION

The present invention relates generally to hydrocarbon production, and specifically to casing gas venting and optimal equipment operation in hydrocarbon production facilities.

BACKGROUND

It is well known in the art of subsurface oil production that solution gas is also often produced to surface. Such gas commonly travels to surface in the well casing (thus called "casing gas"). Casing gas has traditionally been vented to the atmosphere or flared, rather than conserved through onsite storage or pipelining to remote locations generally due to cost considerations when addressing relatively low volumes of casing gas.

Government regulations are increasingly reducing vent gas allowances, thus requiring increased flaring or conservation of the casing gas. However, flaring introduces increased risk, landowner concerns, and possibly area class spacing issues. In addition, gas conservation may not be possible or economical in certain situations. Gas conservation may also be problematic where the casing gas is sour—increasing costs associated with necessary controls—or where the gas is of low grade or does not meet gas system specifications.

In some prior art systems, the oil pumps are driven by engines that are configured to burn natural gas, and specifically natural gas produced from the well. This provides an option for addressing concerns around venting or flaring of casing gas. For example, U.S. Pat. No. 9,394,770 to Boot et al. teaches using produced gas at a remote location to power an onsite engine, and using the engine to power a generator to produce electricity for the well location. In a further example, United States Patent Application Publication No. 2010/0038907 to Hunt et al. teaches capturing casing gas to drive the pump engine, and also using the engine to drive one or more generators to create electricity.

However, it is known that gas volumes are not static during production, and volumes can vary substantially over time. Allowing an engine to burn whatever volume of gas is produced can thus result in the engine operation increasing to dangerous levels, possibly to redline where damage to the engine can occur. Well sites are commonly in remote locations, and therefore it is likely that such dangerous engine conditions would occur when personnel are not at site to address the issue, and engine failure could lead to pump shutdown and production losses. Complex equipment solutions may be possible, but they could be economically unfeasible, and as indicated above storage or pipelining of excess gas may also be undesirable or unavailable.

What is needed, therefore, is a means to reduce casing gas venting and flaring while reducing undesirably expensive equipment line-ups and gas storage or pipelining.

BRIEF SUMMARY

The present invention therefore seeks to provide systems and methods that can reduce the amount of produced gas that would otherwise be vented or flared by operating an engine driving the pump in such a way that the engine throttles up to burn increasing amounts of the produced gas, while subjecting the engine to increased mechanical load to maintain the engine operating within a desired revolutions-per-minute ("RPM") range.

According to a first broad aspect of the present invention there is provided a method for reducing gas venting from a hydrocarbon production facility, the facility configured for production of oil using a pump powered by an engine and for production of gas, the method comprising the steps of:
a. producing the oil and the gas to surface;
b. directing at least some of the gas to the engine to power the engine, the engine configured for operation within an optimal RPM range;
c. monitoring pressure of the gas being produced; and
d. in response to an increased pressure of the gas as determined by the monitoring of the gas pressure, increasing an external load on the engine to maintain the engine within the optimal RPM range while increasing engine throttle to burn the gas at the increased pressure.

In some exemplary embodiments of the first aspect, a programmable logic controller is used for increasing the throttle of the engine to burn the increased pressure of the gas and for increasing the external load on the engine. In some other exemplary embodiments a governor is employed to control RPM, wherein a programmable logic controller is used for increasing the external load on the engine and the governor is used to control the engine throttle and maintain the engine within the optimal RPM range.

A gas tree may be used for the step of directing at least some of the gas to the engine to power the engine, and the step of monitoring the pressure of the gas being produced may then be achieved by a sensor located on the gas tree.

The step of increasing the external load on the engine may comprise connecting a generator to the engine to draw power from the engine. The generator may then generate electrical energy, the method comprising the further step of dissipating the electrical energy either by using a load bank or by sending the electrical energy to a utility grid. In some embodiments the electrical energy is used at the facility.

Some exemplary methods comprise the further steps of determining a maximum allowable gas pressure and allowing venting of a portion of the gas to reduce the gas pressure below the maximum allowable gas pressure. In such cases, a regulator may be used to allow the venting of the portion of the gas.

In some exemplary methods, when the monitoring of the gas pressure indicates a reduced pressure of the gas available to the engine, the method comprises the step of reducing the throttle of the engine while decreasing the external load to maintain the RPM within the optimal RPM range.

According to a second broad aspect of the present invention there is provided an engine load control system for use with a hydrocarbon production facility, the facility configured for production of oil and gas, the system comprising:
a pump for producing the oil;
an engine connected to the pump for powering the pump, the engine powered at least partly by the gas produced by the facility, the engine configured for operation within an optimal RPM range having an upper level, the engine comprising a monitor for detecting RPM of the engine;
a gas supply subsystem for supplying the gas to the engine, the gas supply subsystem comprising a sensor for detecting pressure of the gas in the gas supply subsystem;
a generator connected to the engine for providing a load on the engine; and a programmable logic controller configured to receive an RPM signal from the monitor and a gas pressure signal from the sensor, the controller configured to control the RPM of the engine and operation of the generator;

wherein when the gas pressure signal indicates an increase in pressure of the gas, the controller directs the engine to increase engine throttle to burn the gas at the increased pressure; and wherein when the RPM signal indicates that the engine has reached the upper level of the optimal RPM range due to the increased engine throttle, the controller directs the generator to operate so as to increase the load on the engine and consequently maintain the engine within the optimal RPM range while the gas is burned at the increased pressure.

In some exemplary embodiments of the second aspect, the generator is connected to a crankshaft of the engine. The pump may be a hydraulic pump, in which case the hydraulic pump may be connected to the engine and the generator connected to the engine via the hydraulic pump, or the generator may be connected to the engine and the hydraulic pump connected to the generator.

The generator preferably converts mechanical energy from the engine to electrical energy, and such electrical energy may be dissipated either by using a load bank or by a tie-in to a utility grid. In some embodiments the electrical energy is used at the facility.

Systems according to the second aspect preferably further comprise an oil output line from the facility. The controller is preferably manually operable by a touchscreen, and the controller is preferably used to set a plurality of setpoint pressures and corresponding RPM levels.

In some preferred embodiments, the gas supply subsystem comprises a gas tree, and the sensor is on the gas tree. The gas tree may then direct the produced gas to the engine, and optionally some gas may be directed to tank burners for heating emulsion used by the facility. The gas supply subsystem preferably further comprises a regulator for setting a vent gas pressure.

In some preferred embodiments, the gas supply subsystem further comprises a gas volume flow rate monitor.

Where the gas pressure signal indicates a decrease in pressure of the gas, in some exemplary embodiments the controller directs the engine to decrease the engine throttle and directs the generator to operate so as to decrease the load on the engine and consequently maintain the engine within the optimal RPM range.

According to a third broad aspect of the present invention there is provided a method for reducing gas venting from a hydrocarbon production facility, the facility configured for production of oil using an engine-powered pump and for production of gas, the method comprising the steps of:
a. producing the oil and the gas to surface;
b. directing the gas to the engine to power the engine;
c. operating the engine within an optimal RPM range;
d. monitoring RPM of the engine;
e. monitoring pressure of the gas available to be directed to the engine;
f. in response to an increased pressure of the gas available to the engine as determined by the monitoring of the pressure of the gas, increasing the engine throttle to burn the increased pressure of the gas; and
g. in response to the RPM of the engine consequently reaching an upper level of the optimal RPM range as determined by the monitoring of the RPM of the engine, increasing an external load on the engine to maintain the engine within the optimal RPM range while burning the gas at the increased pressure.

In some exemplary embodiments of the third aspect, a programmable logic controller is used for increasing the throttle of the engine to burn the increased pressure of the gas and for increasing the external load on the engine.

A gas tree may be used for the step of directing the gas to the engine to power the engine, and the step of monitoring the pressure of the gas being directed to the engine may then be achieved by a sensor located on the gas tree.

The step of increasing the external load on the engine may comprise connecting a generator to the engine to draw power from the engine. The generator may then generate electrical energy, the method comprising the further step of dissipating the electrical energy either by using a load bank or by sending the electrical energy to a utility grid. In some embodiments the electrical energy is used at the facility.

Some exemplary methods comprise the further steps of determining a maximum allowable gas pressure and allowing venting of a portion of the gas to reduce the gas pressure below the maximum allowable gas pressure. In such cases, a regulator may be used to allow the venting of the portion of the gas.

In some exemplary methods, when the monitoring of the gas pressure indicates a reduced pressure of the gas available to the engine, the method comprises the step of reducing the throttle of the engine while decreasing the external load to maintain the RPM within the optimal RPM range.

According to a fourth broad aspect of the present invention there is provided a system for maintaining operation of an engine within a predetermined engine RPM range, the engine powered at least in part by produced subsurface gas and for powering a pump for producing subsurface oil, the system comprising:

a programmable logic controller for setting the predetermined engine RPM range, the range comprising an upper level;

a gas supply subsystem for directing the produced gas to the engine for powering the engine, the gas supply subsystem comprising a sensor for detecting pressure of the gas in the gas supply subsystem and a gas pressure signal generator for sending a gas pressure signal to the programmable logic controller;

an engine RPM control subsystem comprising a monitor for detecting RPM of the engine and an engine RPM signal generator for sending an engine RPM signal to the programmable logic controller; and an external load subsystem connected to the engine for providing a load on the engine;

wherein when the gas pressure signal indicates an increase in pressure of the gas available for consumption by the engine, the programmable logic controller directs the engine to increase throttle to burn the gas at the increased pressure; and wherein when the engine RPM signal indicates that the engine has reached the upper level of the range due to the increased throttle, the programmable logic controller directs the external load subsystem to provide the load on the engine and consequently maintain the engine within the predetermined engine RPM range while the gas is burned at the increased pressure.

In some exemplary embodiments of the fourth aspect, the load comprises a generator connected to the engine. Such a generator may be connected to a crankshaft of the engine. The generator may convert mechanical energy from the engine to electrical energy, which electrical energy may be dissipated either by using a load bank or by a tie-in to a utility grid.

In embodiments where the pump is a hydraulic pump and the load comprises a generator, the hydraulic pump may be connected to the engine and the generator connected to the engine via the hydraulic pump, or the generator may be connected to the engine and the hydraulic pump connected to the generator.

In preferred systems, an oil output line is provided to allow transport or storage of the produced oil.

In some exemplary embodiments, the gas supply subsystem comprises a gas tree, and the sensor is on the gas tree. The gas tree may be configured to direct some or all of the produced gas to the engine. The gas supply subsystem may further comprise a regulator for setting a vent gas pressure.

In some exemplary embodiments, the programmable logic controller is manually operable by a touchscreen. The programmable logic controller may be used to set a plurality of setpoint pressures and corresponding engine throttle levels; for example, a series of setpoint pressures can be established, such that when a certain setpoint is reached the controller directs the engine throttle to operate at a throttle level appropriate for that pressure level and the increased volume of gas that is to be burned by the engine, with increasing engine throttle for increasing pressure setpoints, up to a maximum allowable pressure at which point the system would vent the residual gas. In contrast, when the gas pressure signal indicates a decrease in pressure of the gas, the programmable logic controller directs the engine to decrease the engine throttle and directs the external load subsystem to decrease the load on the engine and consequently maintain the engine within the predetermined engine RPM range.

According to a fifth broad aspect of the present invention there is provided an engine load control system for use with a hydrocarbon production facility, the facility configured for production of oil and gas, the system comprising:
a pump for producing the oil;
an engine connected to the pump for powering the pump, the engine powered at least partly by the gas produced by the facility, the engine configured for operation within an optimal RPM range;
a gas supply subsystem for supplying the gas to the engine, the gas supply subsystem comprising a sensor for detecting pressure of the gas in the gas supply subsystem;
a generator connected to the engine for providing a load on the engine;
a governor connected to the engine to control RPM of the engine; and
a programmable logic controller configured to receive a gas pressure signal from the sensor;
wherein when the gas pressure signal indicates an increase in pressure of the gas, the controller directs the generator to increase the load on the engine to burn the gas at the increased pressure, and the governor maintains the RPM of the engine within the optimal RPM range while the gas is burned at the increased pressure.

In some exemplary embodiments of the fifth aspect, the generator is connected to a crankshaft of the engine. The pump may be a hydraulic pump, in which case the hydraulic pump may be connected to the engine and the generator connected to the engine via the hydraulic pump, or the generator may be connected to the engine and the hydraulic pump connected to the generator.

The generator preferably converts mechanical energy from the engine to electrical energy, and such electrical energy may be dissipated either by using a load bank or by a tie-in to a utility grid. In some embodiments the electrical energy is used at the facility.

Systems according to the fifth aspect preferably further comprise an oil output line from the facility. The controller is preferably manually operable by a touchscreen.

In some preferred embodiments, the gas supply subsystem comprises a gas tree, and the sensor is on the gas tree. The gas tree may then direct the produced gas to the engine, and optionally some gas may be directed to tank burners for heating emulsion used by the facility. The gas supply subsystem preferably further comprises a regulator for setting a vent gas pressure.

In some preferred embodiments, the gas supply subsystem further comprises a gas volume flow rate monitor.

Where the gas pressure signal indicates a decrease in pressure of the gas, in some exemplary embodiments the controller directs the generator to operate so as to decrease the load on the engine and consequently maintain the engine within the optimal RPM range.

A detailed description of exemplary embodiments of the present invention is given in the following. It is to be understood, however, that the invention is not to be construed as being limited to these embodiments. The exemplary embodiments are directed to particular applications of the present invention, while it will be clear to those skilled in the art that the present invention has applicability beyond the exemplary embodiments set forth herein.

BRIEF DESCRIPTION OF THE DRAWINGS

In the accompanying drawings, which illustrate exemplary embodiments of the present invention.

Exemplary embodiments of the present invention will now be described with reference to the accompanying drawings.

DETAILED DESCRIPTION OF EXEMPLARY EMBODIMENTS

Throughout the following description, specific details are set forth in order to provide a more thorough understanding to persons skilled in the art. However, well known elements may not have been shown or described in detail to avoid unnecessarily obscuring the disclosure. The following description of examples of the invention is not intended to be exhaustive or to limit the invention to the precise forms of any exemplary embodiment. Accordingly, the description and drawings are to be regarded in an illustrative, rather than a restrictive, sense.

Exemplary embodiments of the present invention are presented below, illustrating the principles of the present invention. Three exemplary systems and three exemplary methods are illustrated.

Figure 1:
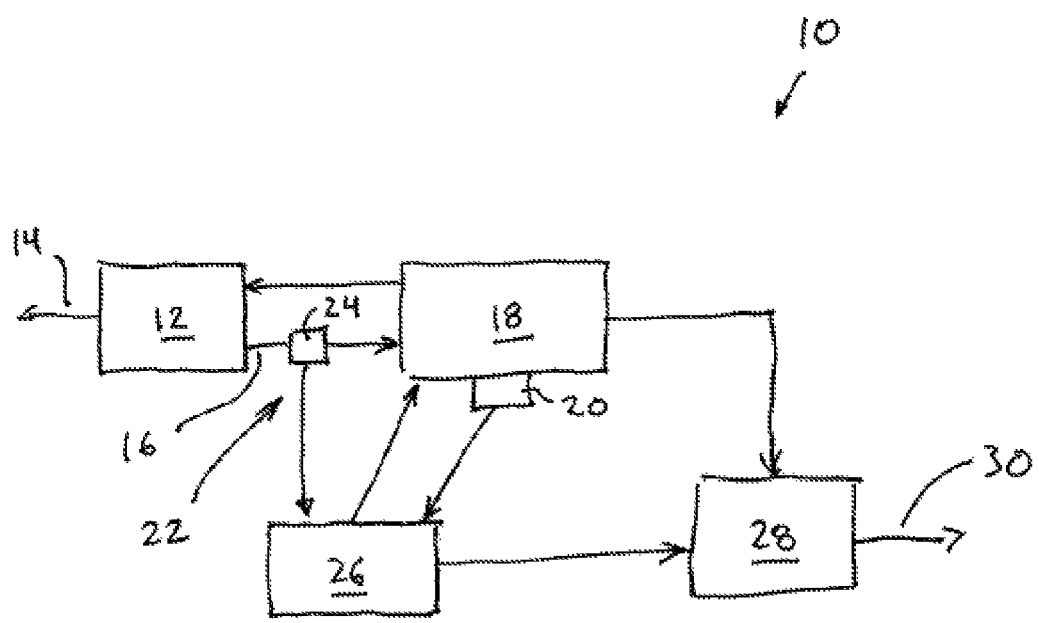
FIG. 1 is a simplified schematic of a first exemplary system according to the present invention.

Turning to FIG. 1, a first exemplary system 10 is illustrated in a highly simplified schematic manner. The system 10 is intended as a means for controlling the load on a pump engine, as a way to burn enhanced volumes of produced casing gas while maintaining the engine within safe operating parameters. The system 10 comprises a pump 12, which would be a conventional pump used to produce subsurface oil to surface, while casing gas flows freely to surface up the annulus (between the tubing string and the production casing). The oil would be output using an output line 14, which would in the exemplary embodiment go to a storage tank or tie into a pipeline system (not shown). The produced natural gas would travel through a gas output line 16 of a gas supply subsystem 22 to an engine 18. The engine 18 would be configured to both burn the produced natural gas as at least part of its fuel, and provide power for operation of the pump 12. While the skilled person would be able to determine an appropriate engine for a given wellsite facility, natural gas engines appropriate to some embodiments of the present invention would include a Cummins 5.9 L or 8.3 L engine or a GM 4.3 L or 5.7 L engine. It will be understood that a back-up fuel source should be in place in the event that insufficient casing gas is available for consumption to power the pump 12.

In order to control operation of the engine 18 to consume gas volumes as they increase, the gas supply subsystem 22 is provided with a gas pressure sensor 24. The sensor 24 monitors the gas pressure within the gas supply subsystem 22 and sends a signal to a programmable logic controller or PLC 26 when the pressure increases. This allows the PLC 26 to direct the engine 18 to increase its throttle and thus burn a greater volume of produced casing gas, as the increased pressure is an indication of greater gas volumes available for consumption in preference to venting or flaring. While the description mentions only a gas pressure sensor 24, it should be stated that other sensors may be used with embodiments of the present invention, such as for one non-limiting example flow monitoring devices to detect gas volume flow rate changes in the gas supply subsystem 22. Where regulators are used (as in the embodiment of FIG. 2 described below), pressure and gas volume measurements can be taken from the well upstream of the regulators (the casing gas pressure) and downstream of or between casing gas regulators (for gas tree pressure, where a gas tree is present).

Figure 2:
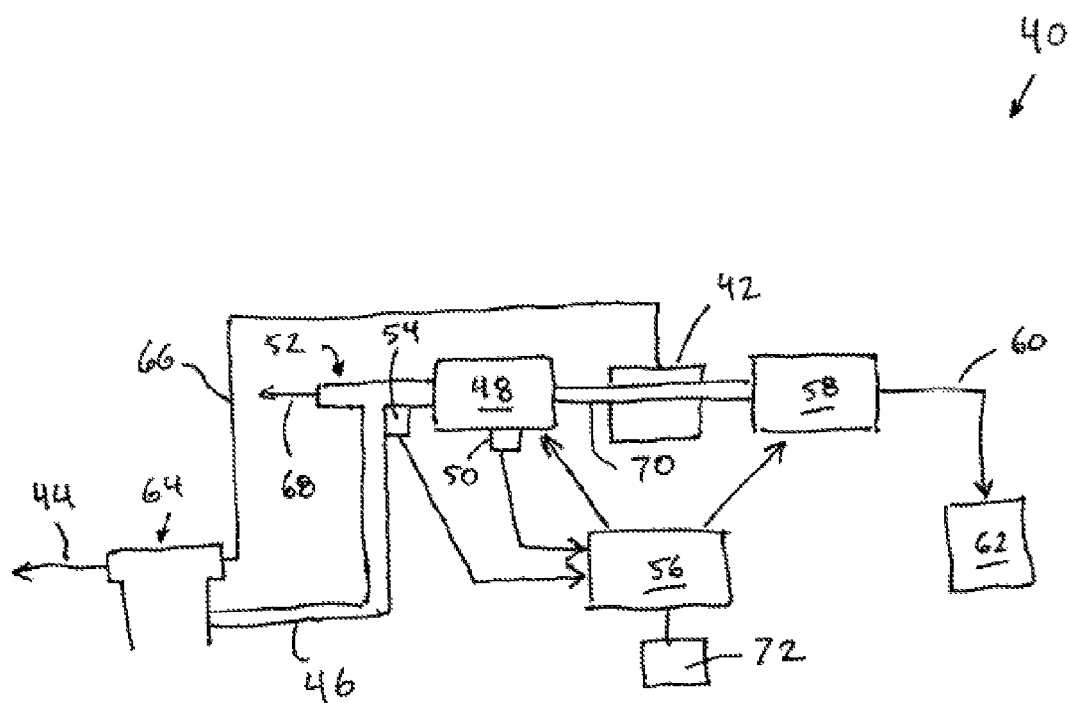
FIG. 2 is a simplified schematic of a second exemplary system according to the present invention.

As the engine 18 could enter an unsafe redline condition if allowed to simply increase throttle automatically with increased gas pressure/volumes, the system 10 comprises a generator 28 to provide an artificial load on the engine 18 and effectively act as a brake to maintain RPM within a safe operating range. While the skilled person could determine an appropriate generator based on specific need, Stamford generators (e.g., 44, 60 or 105 kW) may be used with some embodiments of the present invention. The generator 28, when operating, would draw power from the engine 18 and thus maintain the RPM operating within a safe range based on the engine 18 specifications. The generator 28 would then generate electricity, which would go to an electrical energy output 30—this electrical energy could be dissipated as heat or captured through a utility tie-in, or in some embodiments could potentially be used with an on-site power supply system. The generator 28 could be mechanically connected to the engine 18 in numerous ways that would be clear to the skilled person, including a direct drive arrangement, a gear reduction assembly, a belt drive or a chain drive, and FIG. 2 illustrates an alternative arrangement in which the pump is positioned between the engine and the generator and the three are mechanically coupled together.

To determine when and to what load level the generator 28 needs to operate, the engine 18 is provided with an RPM monitor 20 which detects the engine 18 RPM and transmits a corresponding signal to the PLC 26. The PLC 26 therefore receives input signals from both the gas pressure sensor 24 and the RPM monitor 20, and then sends signals to each of the engine 18 and generator 28 as to operating conditions. The PLC 26 can be designed to communicate in a wired or wireless fashion, as deemed appropriate for the context by the skilled person.

The PLC 26 thus allows for variable control of the generator 28 load, telling the generator 28 to draw a specific load based on the engine 18 RPM. For example, if the engine 18 has an operating range of 1850 RPM to 1950 RPM, the generator 28 load can be set to 0 kW from 1850 to 1880 RPM; once the RPM reaches 1885 RPM, the generator 28 load could be set for 10 kW (13 hp), and at 1890 RPM the load could be set at 20 kW (26 hp), and so on. As the generator 28 converts mechanical energy into electrical energy, it allows for dissipation of energy created by the engine 18 through a resistive load bank or tie-in to an electrical utility.

Alternative technologies are available for the artificial load provided by a generator in the exemplary embodiment. For example, a water brake could be used wherein load dissipation is variable based on the volume of water in the brake in conjunction with RPM. The mechanical load on the engine is dissipated as heat into the water when water is passed through the brake. Exiting water from the brake would then be cooled and re-supplied to the brake intake depending on the required vent consumption and engine load. As a further example, an eddy current brake could be employed. The drag force in an eddy current brake is an electromagnetic force between a magnet and nearby conductive object in relative motion, which is due to the eddy currents induced in the conductor through electromagnetic induction. Such a device could be used to vary artificial load on the engine to reduce or eliminate vent gas, with the excess casing gas converted to a final product of heat. However, a generator is the preferred external load mechanism, as it is both cost-effective and robust and can provide an advantageous closed-system solution for oil leases.

It will be clear that specifications for the engine, generator, load bank and other components are design-specific and would be within the competence of the skilled person to select based on the within teaching.

Turning now to FIG. 2, a second exemplary system 40 is illustrated. The system comprises an hydraulic pump 42 for producing oil and gas as part of an hydraulic wellhead/oil drive 64. Hydraulic lines 66 run from the pump 42 to the wellhead 64 to power the drive. Oil/emulsion is output through a line 44 which would connect to a storage tank or pipeline system (not shown), while the gas output line 46 is part of a gas tree 52. A gas pressure sensor 54 is illustrated as part of the gas tree 52, which sensor 54 communicates with a PLC 56, in a manner similar to the above description regarding FIG. 1. The PLC 56 would thus communicate with the gas tree 52 to receive wellhead casing pressure, or gas tree pressure if the gas tree 52 is provided with a Fulflo™ valve. FIG. 2 illustrates the second exemplary embodiment in highly simplified form, and it should be noted that the placement of the gas pressure sensor 54 will vary in actual practice, depending on the sensor type and whether it is a gas tree pressure sensor or an upstream pressure sensor for casing gas, and the skilled person would know how to position the sensor based on the within teaching.

The gas is directed through the gas tree 52 to the engine 48, which burns the gas to provide power to the pump 42. In this embodiment, the engine 48 has a crankshaft 70 which provides mechanical energy to operate the pump 42. The crankshaft 70, however, passes through the pump 42 and thus provides mechanical energy to drive an adjacent generator 58. Reference is made to the above description of FIG. 1 regarding these components and their general operation.

The engine 48 is provided with an RPM monitor 50, as is described above with respect to FIG. 1, with the monitor 50 communicating with the PLC 56 to provide information on the RPM of the engine 48. Based on input from the sensor 54 and the monitor 50, the PLC 56 communicates with the engine 48 and the generator 58 as to operating conditions. When the sensor 54 indicates that an increased gas pressure (or volume) is present in the well, the PLC 56 directs the engine 48 to operate at a higher throttle to burn the increased gas amount. If the engine 48 speed approaches a level at or near unsafe operating conditions, as indicated by the monitor 50 communications with the PLC 56, the PLC 56 directs the generator 58 to operate to increase the load on the engine 48 and thus act effectively as a brake on the engine 48 and maintain RPM within a safe operating range. Operation of the generator 58 generates electrical energy, which is sent through an electricity output 60 to a load bank 62 for dissipation in this exemplary embodiment.

The gas tree 52 is also provided with a vent means and regulator 68. When a conventional well vents, the casing gas pressure (gas tree pressure) must increase to a specific pressure set by a regulator (which then vents directly from the gas tree to the atmosphere), and the regulator can be set at any backpressure by the operator; if, for example, the backpressure is set at 100 kPa, gas will not vent below this pressure. The regulator 68 in the embodiment of FIG. 2 would likewise be set to a backpressure selected as a maximum allowable pressure in the gas tree 52.

As the gas pressure increases in the gas tree 52, the sensor 54 sends this information to the PLC 56 and the PLC 56 directs the engine 48 to increase throttle accordingly to an established setpoint for that specific pressure.

Correlated pressures and throttle setpoints can be established and saved in the PLC 56 for automatic operation, but they are preferably selectively manipulable by an operator in the field using a touchscreen 72. For example, the engine 48 can be set to operate at a base throttle (setpoint 1) when at or below 20 kPa gas pressure, but would increase to a higher throttle (setpoint 2) should the gas pressure be detected as achieving 30 kPa. If gas pressure continues to increase, further pressure increases will result in the PLC 56 directing the engine 48 to operate at higher corresponding setpoints. If the pressure increases to the maximum allowable pressure, the regulator 68 would operate to allow venting and consequent pressure reduction within the gas tree 52. If pressure decreases during operation, the PLC 56 would direct the engine 48 (throttle reduction) and generator 58 (load reduction) accordingly.

The PLC 56 is preferably programmed to enable automatic responses to increasing or decreasing gas pressures, and increasing RPM of the engine 48, as personnel will in most cases not be continuously onsite to monitor and make manual changes to operation parameters. However, the exemplary system of FIG. 2 includes the touchscreen 72 as a means for an operator to monitor and adjust the system 40 parameters if they are present. For example, the touchscreen 72 could show such information as produced gas pressure, engine RPM, engine throttle position, load bank load and generator voltage, and allow for changes to operating parameters where deemed necessary by the operator.

As will be clear to those skilled in the art, either the casing gas pressure or the gas tree pressure can be used to direct the load/throttle logic. The casing gas pressure could be 0-4000 kPa, whereas the gas tree pressure is commonly limited to approximately 100 kPa. There are commonly two pressure safety valves, one set at 15 lbs and the other at 100 lbs. The gas tree regulator is for managing the pressure from 0-100 kPa. A Fulflo™ or Kimray™ valve is commonly employed to regulate casing gas pressure (located between the well and the gas tree).

Figure 3:
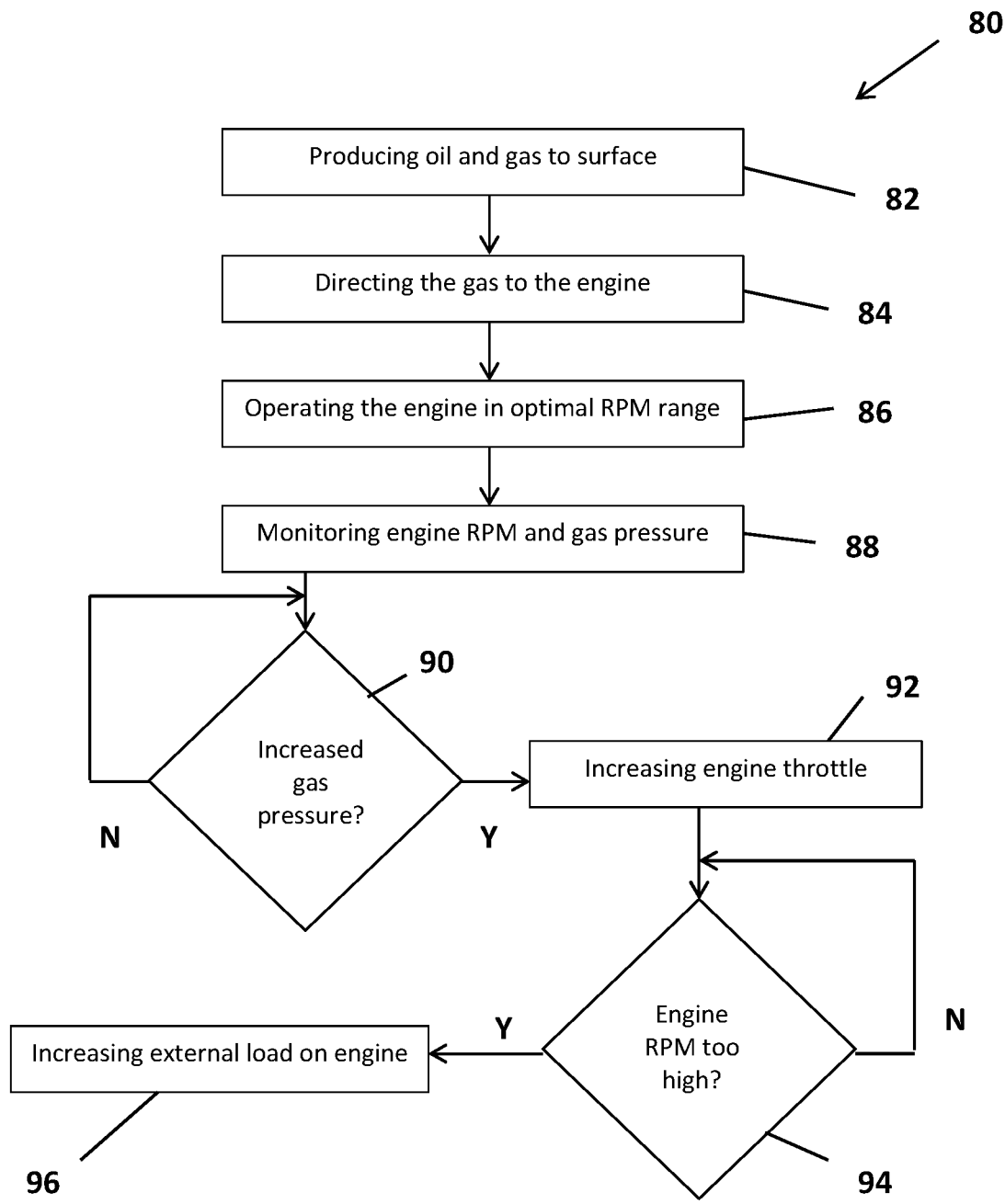
FIG. 3 is a flowchart of a first exemplary method according to the present invention.
Figure 4:
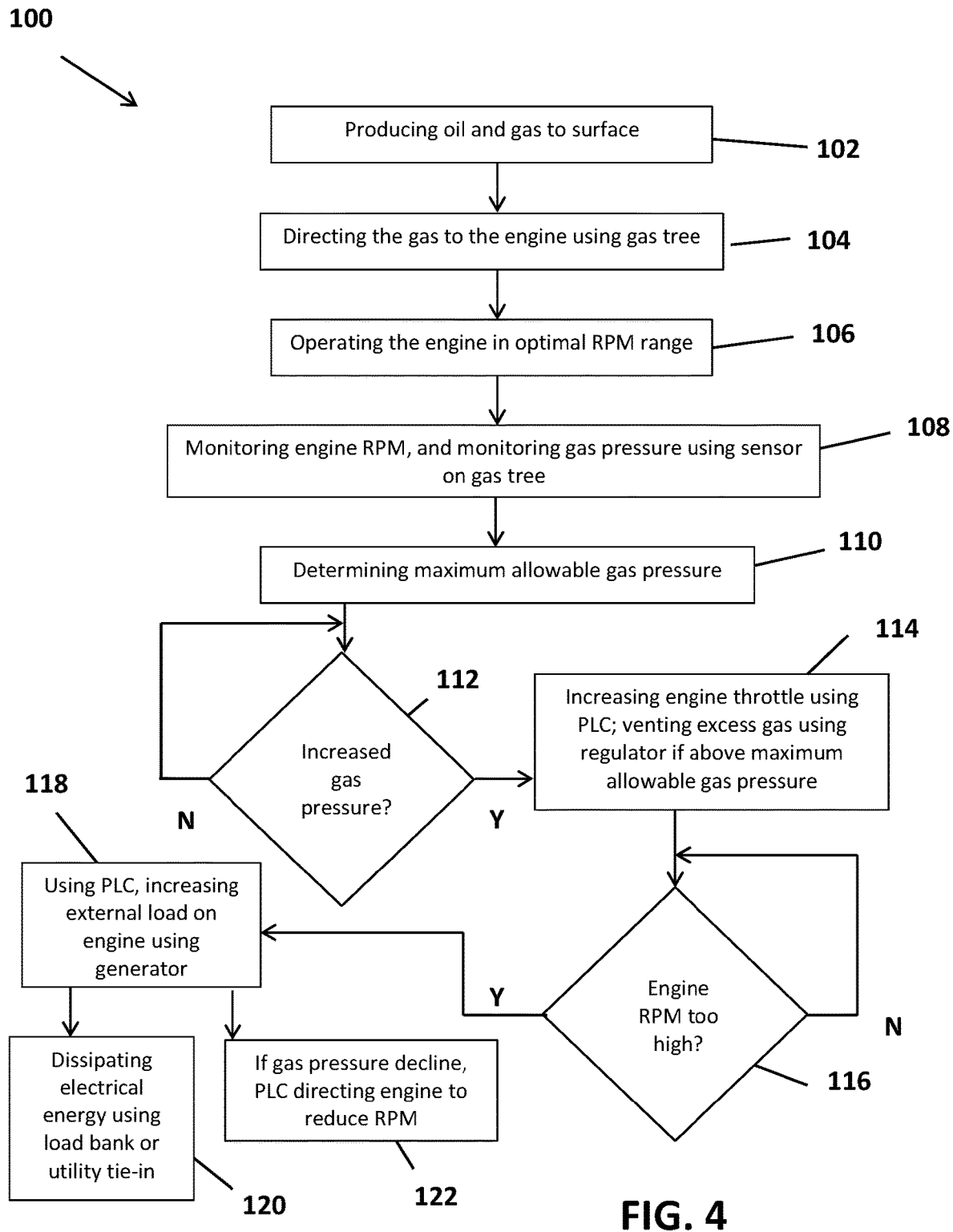
FIG. 4 is a flowchart of a second exemplary method according to the present invention.

Turning now to FIGS. 3 and 4, exemplary methods according to the present invention are illustrated.

FIG. 3 illustrates a method 80 which begins with producing the oil and gas to surface at step 82. At step 84 the produced gas is directed to the engine for combustion and powering of the pump, and the engine is operated within an optimal speed range at step 86. At step 88 and throughout the method 80, the engine RPM and gas pressure are monitored.

If gas pressure remains stable at decision point 90, the method continues to loop back for monitoring. If, however, the monitoring shows that gas pressure has increased, the engine throttle is increased at step 92 to compensate for the increased amount of gas being produced.

If the engine RPM remains stable and within the optimal range at decision point 94, the method continues to loop back for monitoring. If it is determined that the engine RPM is too high and may be approaching redline conditions, an external load is applied to the engine at step 96. This external load could be operation of a generator to effect a brake on the engine, but other load mechanisms are possible within the scope of the invention. The method 80 thus allows for combustion of an increased or increasing volume of gas by the engine while maintaining the engine within safe operating parameters using the external load as a brake.

Turning now to FIG. 4, a method 100 is illustrated which adds further complexity. Oil and gas are produced to surface at step 102, with the gas directed through a gas tree to the engine at step 104. The engine is operated within the optimal RPM range given engine specifications at step 106, while the engine RPM is monitored and the gas pressure is monitored using a sensor on the gas tree at step 108. Further, a maximum allowable gas pressure is determined at step 110, based in part on system specifications and vent allowances.

At decision point 112, a determination is made as to whether or not the gas pressure in the gas tree has increased. If there has been no increase, the method loops and monitoring continues. If an increase is detected, a PLC is used to direct the engine to increase its throttle at step 114, while excess gas is vented using a regulator if the pressure reaches or exceeds the maximum allowable gas pressure determined at step 110.

At decision point 116, a determination is made as to whether or not the engine is now operating at an unsafe level due to the increased throttle. If the engine is operating at an RPM that is within a safe range, the method loops and monitoring continues. If it is determined that the engine RPM is too high, the PLC at step 118 increases an external load on the engine using a generator, to brake the engine and maintain RPM within the safe range. Electrical energy generated by the generator is dissipated at step 120 using a load bank or utility tie-in. If the gas pressure declines, the PLC at step 122 then directs the engine to reduce throttle and may also direct the generator to reduce the load on the engine.

Figure 5:
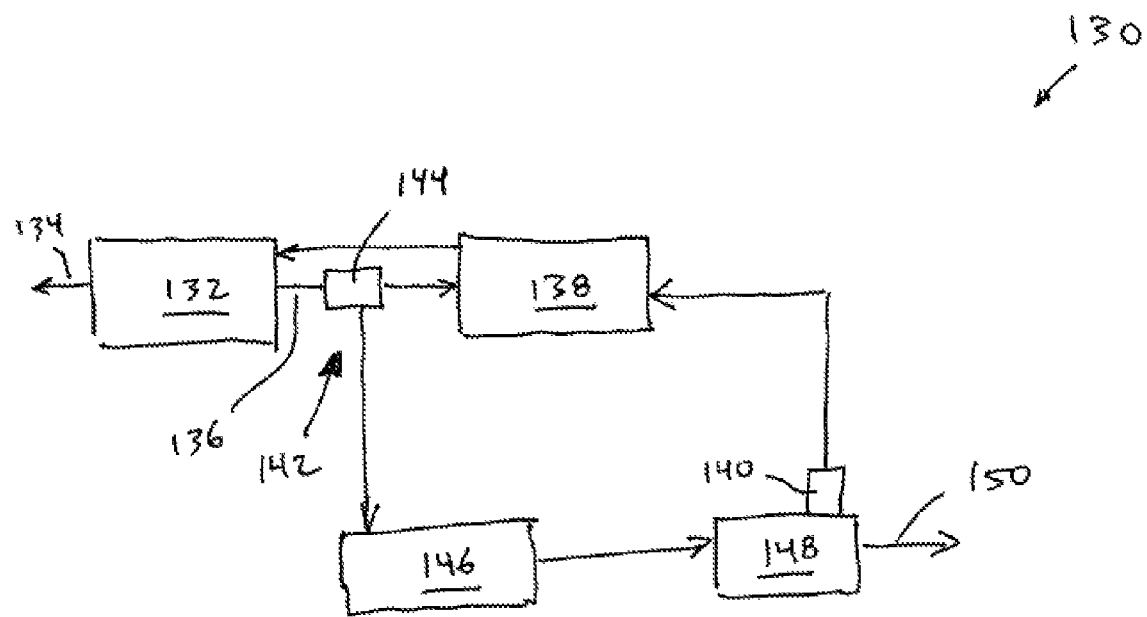
FIG. 5 is a simplified schematic of a third exemplary system according to the present invention.
Figure 6:
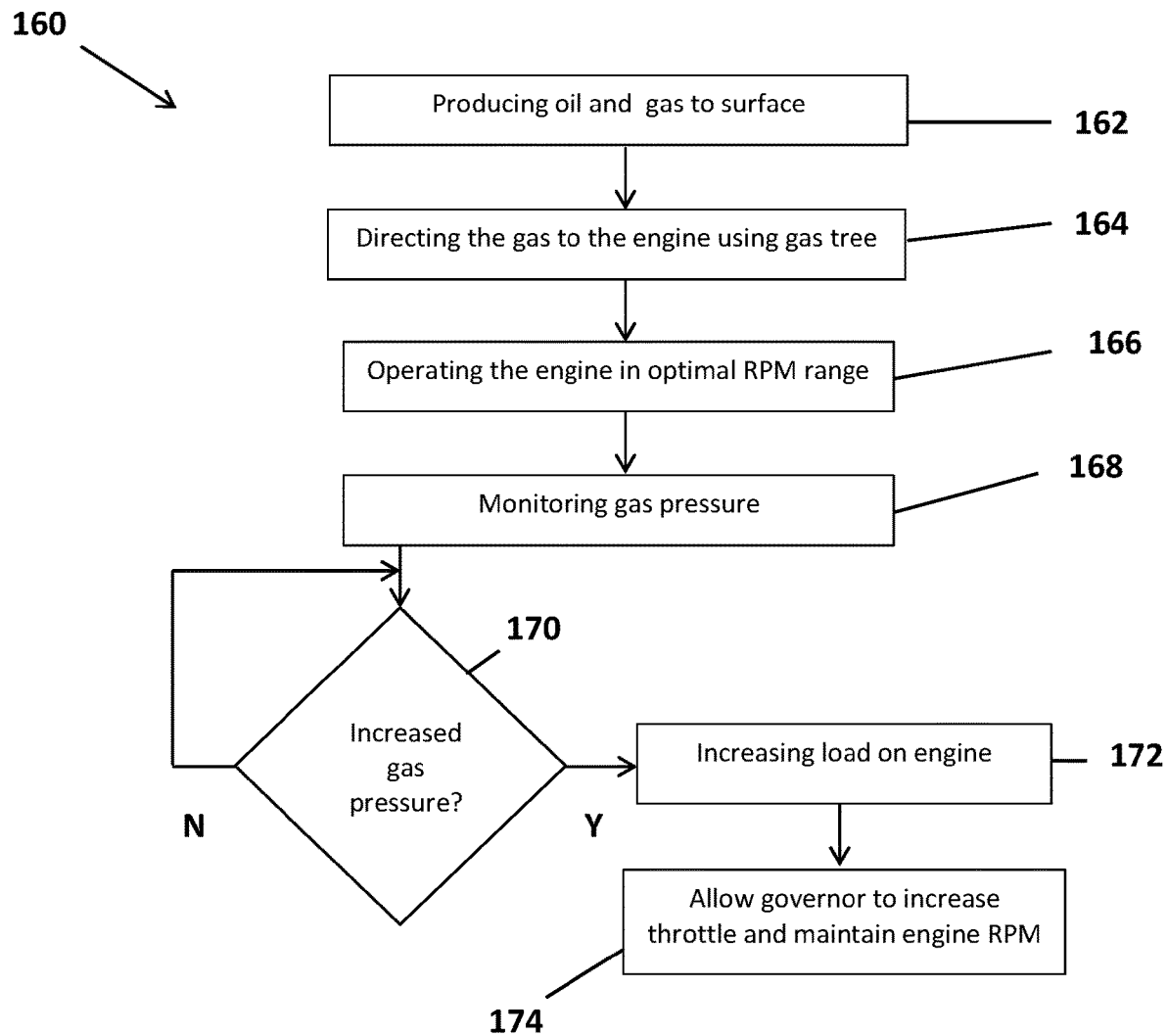
FIG. 6 is a flowchart of a third exemplary method according to the present invention.

Turning now to FIGS. 5 and 6, a further exemplary embodiment is illustrated. FIG. 5 illustrates a system 130 which again allows for monitoring of gas pressure to control operation of an engine to burn more gas as pressures increase, but in this embodiment the gas pressure initiates application of a load to a generator, and a governor controls engine throttle to maintain RPM within a safe operating range. Note that while FIG. 5 shows the governor as connected to the generator, in some embodiments the governor will be separate from the generator and instead connected to the engine. No specific RPM monitoring equipment is required in this embodiment, although those skilled in the art will recognize that a governor can automatically function to manage throttle position and maintain the engine RPM within the desired operating range.

The system 130 comprises a pump 132 for producing oil from a well, while gas travels to surface in the well annulus. The produced oil is output to storage or transport facilities through an oil output line 134, while the gas is sent through a gas output line 136 to a gas supply subsystem 142. The gas supply subsystem 142 comprises a gas pressure sensor 144, as has been described above with respect to other illustrative embodiments of the present invention.

The gas pressure sensor 144 communicates with a programmable logic controller or PLC 146, providing signals indicative of increases or decreases of gas pressure and thus gas available to an engine 138 for combustion.

The engine 138 operates much as engines of the other exemplary embodiments set forth herein. The engine 138 combusts produced casing gas to power the pump 132.

Unlike the above exemplary embodiments, the system 130 comprises a generator 148 and a conventional governor 140. The governor 140 controls the engine 138 throttle by managing fuel supply, and automatically functions to maintain RPM within a set safe operating range. Those skilled in the art will be well aware of how governors function, including mechanical, hydraulic and electrical governors, and how they can be set to control engine throttle and thus RPM. One exemplary governor that may be used with some embodiments of the present invention is an electric Woodward™ governor.

In this exemplary embodiment, the gas pressure sensor 144 would detect increased gas pressure and send a signal to the PLC 146. The PLC 146 would then direct the generator 148 (or a load bank drawing energy from the generator 148) to increase the load on the engine 138. The engine 138 would thus increase throttle to burn more produced gas, but the governor 140 would operate to control the engine 138 and maintain RPM within the desired optimal operating range. The governor 140 manages the throttle depending on the engine RPM, maintaining the operating RPM of the engine 138 and keeping the engine 138 from either stalling (from increased load) or running to redline (from decreased load). In this way, fuel (gas) consumption can be increased while maintaining the engine 138 RPM at a relatively stable level. Electrical energy produced by the generator 148 can be output at line 150.

Turning now to FIG. 6, a further exemplary method 160 is illustrated. In method 160, oil and gas are produced to surface at step 162, with the gas directed to the engine via the gas tree at step 164. The engine burns the produced gas as fuel, operating in the optimal, desired RPM range at step 166. Gas pressure is monitored at step 168. At decision point 170, a determination is made as to whether there has been a change in gas pressure; if there is no change, monitoring continues. If there has been an increase, at step 172 the load on the engine is increased (which may be a generator, as described above with respect to FIG. 5). At step 174, then, the governor functions to increase the engine throttle and maintain engine RPM within the optimal RPM range. It will be clear that, should gas pressure decrease, the governor would also operate to reduce throttle and thus maintain engine RPM within the optimal range as the generator reduces load.

As will be clear from the above, those skilled in the art would be readily able to determine obvious variants capable of providing the described functionality, and all such variants and functional equivalents are intended to fall within the scope of the present invention.

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to".

"connected", "coupled", or any variant thereof, means any connection or coupling, either direct or indirect, between two or more elements; the coupling or connection between the elements can be physical, logical, or a combination thereof.

"herein", "above", "below", and words of similar import, when used to describe this specification shall refer to this specification as a whole and not to any particular portions of this specification.

"or", in reference to a list of two or more items, covers all of the following interpretations of the word: any of the items in the list, all of the items in the list, and any combination of the items in the list.

the singular forms "a", "an" and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

Where a component (e.g. a circuit, module, assembly, device, drill string component, drill rig system etc.) is referred to herein, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of methods and systems have been described herein for purposes of illustration. These are only examples. The technology provided herein can be applied to contexts other than the exemplary contexts described above. Many alterations, modifications, additions, omissions and permutations are possible within the practice of this invention. This invention includes variations on described embodiments that would be apparent to the skilled person, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

The foregoing is considered as illustrative only of the principles of the invention. The scope of the claims should not be limited by the exemplary embodiments set forth in the foregoing, but should be given the broadest interpretation consistent with the specification as a whole.

What is claimed is:

1. A method for reducing gas venting from a hydrocarbon production facility, the facility configured for production of oil using a pump powered by an engine and for production of gas, the method comprising the steps of:
   a. producing the oil and the gas to surface;
   b. directing at least some of the gas to the engine to power the engine, the engine configured for operation within an optimal RPM range;
   c. monitoring pressure of the gas being produced; and
   d. in response to an increased pressure of the gas as determined by the monitoring of the gas pressure, using a programmable logic controller to increase an external load on the engine via a generator to maintain the engine within the optimal RPM range while increasing engine throttle to burn the gas at the increased pressure, the external load selected from the group consisting of a resistive load bank, a water brake and an eddy current brake.

2. The method of claim 1 further comprising using the programmable logic controller for the step of increasing the engine throttle to burn the gas at the increased pressure.

3. The method of claim 1 further comprising using a governor to increase the engine throttle to burn the gas at the increased pressure.

4. The method of claim 1 wherein a gas tree is used for the step of directing at least some of the gas to the engine to power the engine.

5. The method of claim 4 wherein the step of monitoring the pressure of the gas being produced is achieved by a sensor located on the gas tree.

6. The method of claim 1 comprising the further steps of determining a maximum allowable gas pressure and allowing venting of a portion of the gas to reduce the gas pressure below the maximum allowable gas pressure.

7. The method of claim 6 further comprising using a regulator to allow the venting of the portion of the gas.

8. The method of claim 1 wherein when the monitoring of the gas pressure indicates a reduced pressure of the gas available to the engine, the method comprises the step of reducing the engine throttle while decreasing the external load to maintain the RPM within the optimal RPM range.

9. An engine load control system for use with a hydrocarbon production facility to reduce gas venting from the facility, the facility configured for production of oil and gas, the system comprising:
   a pump for producing the oil;
   an engine connected to the pump for powering the pump, the engine powered at least partly by the gas produced by the facility, the engine configured for operation within an optimal RPM range having an upper level, the engine comprising a monitor for detecting RPM of the engine;
   a gas supply subsystem for supplying the gas to the engine, the gas supply subsystem comprising a sensor for detecting pressure of the gas in the gas supply subsystem;
   an external load connected to the engine via a generator for providing a load on the engine, the external load selected from the group consisting of a resistive load bank, a water brake and an eddy current brake; and
   a programmable logic controller configured to receive an RPM signal from the monitor and a gas pressure signal from the sensor, the controller configured to control the RPM of the engine and operation of the external load;
   wherein when the gas pressure signal indicates an increase in pressure of the gas, the controller directs the engine to increase engine throttle to burn the gas at the increased pressure; and
   wherein when the RPM signal indicates that the engine has reached the upper level of the optimal RPM range due to the increased engine throttle, the controller directs the external load to operate so as to increase the load on the engine and consequently maintain the engine within the optimal RPM range while the gas is burned at the increased pressure.

10. The system of claim 9 wherein the pump is a hydraulic pump.

11. The system of claim 10 wherein the hydraulic pump is connected to the engine.

12. The system of claim 9 further comprising an oil output line from the facility.

13. The system of claim 9 wherein the gas supply subsystem comprises a gas tree, and the sensor is on the gas tree.

14. The system of claim 13 wherein the gas tree directs the produced gas to the engine.

15. The system of claim 13 wherein the gas supply subsystem further comprises a regulator for setting a vent gas pressure.

16. The system of claim 9 wherein the gas supply subsystem further comprises a gas volume flow rate monitor.

17. The system of claim 9 wherein the controller is manually operable by a touchscreen.

18. The system of claim 9 wherein the controller is used to set a plurality of setpoint pressures and corresponding RPM levels.

19. The system of claim 9 wherein when the gas pressure signal indicates a decrease in pressure of the gas, the controller directs the engine to decrease the engine throttle and decreases the external load on the engine and consequently maintain the engine within the optimal RPM range.

20. A method for reducing gas venting from a hydrocarbon production facility, the facility configured for production of oil using an engine-powered pump and for production of gas, the method comprising the steps of:
   a. producing the oil and the gas to surface;
   b. directing the gas to the engine to power the engine;
   c. operating the engine within an optimal RPM range;
   d. monitoring RPM of the engine;
   e. monitoring pressure of the gas available to be directed to the engine;
   f. in response to an increased pressure of the gas available to the engine as determined by the monitoring of the pressure of the gas, using a programmable logic controller to increase the engine throttle to burn the increased pressure of the gas; and
   g. in response to the RPM of the engine consequently reaching an upper level of the optimal RPM range as determined by the monitoring of the RPM of the engine, increasing an external load on the engine via a generator to maintain the engine within the optimal RPM range while burning the gas at the increased pressure, the external load selected from the group consisting of a resistive load bank, a water brake and an eddy current brake.

21. The method of claim 20 wherein a gas tree is used for the step of directing the gas to the engine to power the engine.

22. The method of claim 21 wherein the step of monitoring the pressure of the gas being directed to the engine is achieved by a sensor located on the gas tree.

23. The method of claim 20 comprising the further steps of determining a maximum allowable gas pressure and allowing venting of a portion of the gas to reduce the gas pressure below the maximum allowable gas pressure.

24. The method of claim 23 comprising using a regulator to allow the venting of the portion of the gas.

25. The method of claim 20 wherein when the monitoring of the gas pressure indicates a reduced pressure of the gas available to the engine, the method comprises the step of reducing the throttle of the engine while decreasing the external load to maintain the RPM within the optimal RPM range.

26. An engine load control system for use with a hydrocarbon production facility to reduce gas venting from the facility, the facility configured for production of oil and gas, the system comprising:
- a pump for producing the oil;
- an engine connected to the pump for powering the pump, the engine powered at least partly by the gas produced by the facility, the engine configured for operation within an optimal RPM range;
- a gas supply subsystem for supplying the gas to the engine, the gas supply subsystem comprising a sensor for detecting pressure of the gas in the gas supply subsystem;
- an external load connected to the engine via a generator for providing a load on the engine, the external load selected from the group consisting of a resistive load bank, a water brake and an eddy current brake;
- a governor connected to the engine to control RPM of the engine; and
- a programmable logic controller configured to receive a gas pressure signal from the sensor;

wherein when the gas pressure signal indicates an increase in pressure of the gas, the controller directs the external load to increase the load on the engine to burn the gas at the increased pressure, and the governor maintains the RPM of the engine within the optimal RPM range while the gas is burned at the increased pressure.

27. The system of claim 26 wherein the pump is a hydraulic pump.

28. The system of claim 27 wherein the hydraulic pump is connected to the engine.

29. The system of claim 26 further comprising an oil output line from the facility.

30. The system of claim 26 wherein the controller is manually operable by a touchscreen.

31. The system of claim 26 wherein the gas supply subsystem comprises a gas tree, and the sensor is on the gas tree.

32. The system of claim 31 wherein the gas tree directs the produced gas to the engine.

33. The system of claim 31 wherein the gas tree further directs some of the produced gas to tank burners for heating emulsion used by the facility.

34. The system of claim 26 wherein the gas supply subsystem further comprises a regulator for setting a vent gas pressure.

35. The system of claim 26 wherein the gas supply subsystem further comprises a gas volume flow rate monitor.

36. The system of claim 26 wherein when the gas pressure signal indicates a decrease in pressure of the gas, the controller directs the external load to operate so as to decrease the load on the engine and consequently maintain the engine within the optimal RPM range.

* * * * *